(12) United States Patent
Tokuda et al.

(10) Patent No.: US 9,102,303 B2
(45) Date of Patent: Aug. 11, 2015

(54) GAS GENERATOR

(71) Applicant: Daicel Corporation, Osaka-shi, Osaka (JP)

(72) Inventors: Masakazu Tokuda, Tatsuno (JP);
Tomoharu Kobayashi, Tatsuno (JP);
Masayuki Yamazaki, Tatsuno (JP);
Kenji Fukumoto, Tatsuno (JP); Katsuya Habu, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 14/186,096

(22) Filed: Feb. 21, 2014

(65) Prior Publication Data

US 2014/0239623 A1    Aug. 28, 2014

Related U.S. Application Data

(60) Provisional application No. 61/768,323, filed on Feb. 22, 2013.

(30) Foreign Application Priority Data

Feb. 22, 2013   (JP) .................................. 2013-032795
Dec. 3, 2013    (JP) .................................. 2013-249994

(51) Int. Cl.
  *B60R 21/272*   (2006.01)
  *B60R 21/26*    (2011.01)

(52) U.S. Cl.
  CPC ..... *B60R 21/272* (2013.01); *B60R 2021/26011* (2013.01)

(58) Field of Classification Search
  CPC ................ B60R 21/272; B60R 21/274; B60R 2021/26011
  USPC ................................... 280/737; 102/530, 531
  See application file for complete search history.

(56) References Cited

U.S. PATENT DOCUMENTS

| | | |
|---|---|---|
| 5,217,697 A | 6/1993 | Kanazawa et al. |
| 6,234,521 B1 | 5/2001 | Katsuda et al. |
| 2003/0151241 A1 | 8/2003 | Matsuda et al. |
| 2004/0066024 A1 | 4/2004 | Shioji et al. |
| 2007/0222195 A1 | 9/2007 | Yabuta et al. |
| 2011/0086224 A1 | 4/2011 | Volpi |

FOREIGN PATENT DOCUMENTS

| | | |
|---|---|---|
| DE | 20 2005 008 938 U1 | 9/2005 |
| JP | 5-4035 A | 1/1993 |
| JP | 7-308726 A | 11/1995 |
| JP | 10-119705 A | 5/1998 |
| JP | 2003-226219 A | 8/2003 |
| JP | 2003-226222 A | 8/2003 |
| JP | 2004-58984 A | 2/2004 |
| JP | 2007-253666 A | 10/2007 |
| JP | 2012-158238 A | 8/2012 |
| JP | 2013-507540 A | 3/2013 |

*Primary Examiner* — Ruth Ilan
(74) *Attorney, Agent, or Firm* — Birch, Stewart, Kolasch & Birch, LLP (57) ABSTRACT

A gas generator includes: a pressurized gas chamber formed by a cylindrical pressurized gas chamber housing filled with a pressurized gas; a combustion chamber connected to a first end portion of the pressurized gas chamber and including an ignition device and a gas generating agent therein, a diffuser portion connected to a second end portion of the pressurized gas chamber and provided with a gas discharge port; a first rupturable plate blocking a first communication passage between the pressurized gas chamber and the combustion chamber; a second rupturable plate blocking a second communication passage between the pressurized gas chamber and the diffuser portion; and a filter disposed and positioned in the pressurized gas chamber to cover the second rupturable plate, allowing, during actuation, the combustion gas from the combustion chamber and the pressurized gas to pass therethrough and be discharged therefrom in response to rupturing the second rupturable plate.

9 Claims, 5 Drawing Sheets

GAS GENERATOR

This nonprovisional application claims priorities under 35 U.S.C. §119 (a) to Patent Application No. 2013-32795 filed in Japan on 22 Feb. 2013 and Patent Application No. 2013-249994 filed in Japan on 3 Dec. 2013, and 35 U.S.C. §119(e) to U.S. Provisional Patent Application No. 61/768,323 filed on 22 Feb. 2013, all of which are incorporated by reference.

BACKGROUND OF INVENTION

1. Field of Invention

The present invention relates to a gas generator used in a restraining device of an air bag system for a vehicle or the like.

2. Description of Related Art

Hybrid gas generators using both pressurized gas and a gas generating agent are widely used.

Specification of DE-U No. 202005008938 discloses a hybrid gas generator. A housing in which a gas generating agent 12 and an ignition device 10 are provided is arranged at one end of a bottle filled with pressurized gas. In addition, a housing which has an outlet opening 28 formed at a peripheral wall portion 30 thereof and internally accommodates a filter 24 is arranged on an opposite end of the bottle. An inlet opening 16 at the one end of the bottle is closed by an inlet film 18, and an outlet opening 20 at the opposite end is closed by an outlet film 22.

JP-A No. 2003-226222 discloses a hybrid gas generator in which a first rupturable plate 40 that blocks between a gas generator 30 and a pressurized gas chamber 20 is covered by a cap 44 from the pressurized gas chamber 20. The cap 44 is provided to arrest combustion residue of a gas generating agent and fragments of the first rupturable plate.

SUMMARY OF INVENTION

Aspect 1 of the invention provides a gas generator inflating an air bag, including:

a pressurized gas chamber having an outer shell and formed by a cylindrical pressurized gas chamber housing, the pressurized gas chamber being filled with the pressurized gas;

a combustion chamber connected to a first end portion of the pressurized gas chamber and including an ignition device and the gas generating agent accommodated in a combustion chamber housing;

a diffuser portion connected to a second end portion of the pressurized gas chamber and provided with a gas discharge port;

a first rupturable plate blocking a first communication passage between the pressurized gas chamber and the combustion chamber;

a second rupturable plate blocking a second communication passage between the pressurized gas chamber and the diffuser portion; and a filter disposed and positioned in the pressurized gas chamber to cover the second rupturable plate, the filter being allowing, during actuation, the combustion gas from the combustion chamber and the pressurized gas to pass therethrough and be discharged therefrom in response to rupturing the second rupturable plate.

Aspect 2 of the invention provides, a gas generator inflating an air bag by combustion gas generated by combustion of a gas generating agent and pressurized gas, including:

a pressurized gas chamber having an outer shell formed by a cylindrical pressurized gas chamber housing, being filled with the pressurized gas;

a combustion chamber connected to a first end portion of the pressurized gas chamber and including an ignition device and a gas generating agent accommodated in a combustion chamber housing;

a diffuser portion connected to a second end portion of the pressurized gas chamber, being in a cap-like shape including a closed end surface, a peripheral surface having a plurality of gas discharge ports, a flange portion at an opening thereof and a cylindrical supporting wall protruding toward the pressurized gas chamber on an annular surface of the flange portion, facing the pressurized gas chamber;

a first rupturable plate blocking a first communication passage between the pressurized gas chamber and the combustion chamber;

a second rupturable plate blocking a second communication passage between the pressurized gas chamber and the diffuser portion;

a cup member accommodating a filter, disposed in the pressurized gas chamber to cover the second rupturable plate from the inside of the pressurized gas chamber, including a bottom surface and a peripheral surface having a plurality of communication holes serving as a gas passage, and being fixed by being fitted to an outer peripheral surface of the cylindrical supporting wall from the outside; and the filter having a second end surface abutted against the bottom surface of the cup member, a peripheral surface of the filter abutted against the peripheral surface of the cup member, a peripheral edge portion of a first end surface abutted against an annular top portion at a tip of the cylindrical supporting wall, and allowing, during actuation, combustion gas from the combustion chamber and pressurized gas to pass therethrough and be discharge therefrom when the second ruptruable plate is broken.

In other words, the aspect 2 is a preferable aspect of the aspect 1 of invention for the gas generator wherein, a diffuser portion is in a cap-like shape including a closed end surface, a peripheral surface having a plurality of gas discharge ports, a flange portion at an opening thereof, and a cylindrical supporting wall protruding toward the pressurized gas chamber on an annular surface of the flange portion, facing the pressurized gas chamber;

a cup member accommodating a filter, is disposed in the pressurized gas chamber to cover the second rupturable plate from an inside of the pressurized gas chamber, the cup member includes a bottom surface and a peripheral surface having a plurality of communication holes serving as a gas passage and is fixed by being fitted to an outer peripheral surface of the cylindrical supporting wall from the outside, the filter has a second end surface abutted against the bottom surface of the cup member and the peripheral surface abutted against the peripheral surface of the cup member, and is provided such that a peripheral edge portion of a first end surface is abutted against an annular top portion at a tip of the cylindrical supporting wall.

Aspect 3 of the invention provides, a gas generator inflating an air bag by combustion gas generated by combustion of a gas generating agent and pressurized gas, including:

a pressurized gas chamber having an outer shell formed by a cylindrical pressurized gas chamber housing, being filled with the pressurized gas;

a combustion chamber connected to a first end portion of the pressurized gas chamber and including an ignition device and a gas generating agent accommodated in a combustion chamber housing;

a diffuser portion connected to a second end portion of the pressurized gas chamber, being in a cap-like shape including a closed end surface, a peripheral surface having a plurality of gas discharge ports, a flange portion at an opening and a cylindrical supporting wall protruding toward the pressurized gas chamber on an annular surface of the flange portion, facing the pressurized gas chamber;

a first rupturable plate blocking a first communication passage between the pressurized gas chamber and the combustion chamber;

a second rupturable plate blocking a second communication passage between the pressurized gas chamber and the diffuser portion;

a cup member accommodating a filter, disposed in the pressurized gas chamber to cover the second rupturable plate from the inside of the pressurized gas chamber, including a bottom surface and a peripheral surface having a plurality of communication holes serving as a gas passage, and being fixed by being fitted to an outer peripheral surface of the cylindrical supporting wall from the outside;

the filter having a second end surface abutted against the bottom surface of the cup member, a peripheral surface of the filter abutted against the peripheral surface of the cup member, a first end surface provided at, or abutted against, a perforated plate member having a plurality of communication holes serving as a gas passage;

the perforated plate member being abutted against an annular top portion at a tip of the cylindrical supporting wall; and the filter allowing, during actuation, combustion gas from the combustion chamber and pressurized gas to pass therethrough and be discharge therefrom when the second rupturable plate is broken.

In other words, the aspect 3 is a preferable aspect of the aspect 1 of invention for the gas generator wherein, a perforated plate member has a plurality of communication holes serving as a gas passage provided at the first end surface of the filter, the perforated plate member is abutted against the annular top portion at the tip of the cylindrical supporting wall.

Aspect 4 of the invention provides, a gas generator inflating an air bag by combustion gas generated by combustion of a gas generating agent and pressurized gas, including:

a pressurized gas chamber having an outer shell formed by a cylindrical pressurized gas chamber housing, being filled with the pressurized gas;

a combustion chamber connected to a first end portion of the pressurized gas chamber and including an ignition device and a gas generating agent accommodated in a combustion chamber housing;

a diffuser portion connected to a second end portion of the pressurized gas chamber, being in a cap-like shape including a closed end surface, a peripheral surface having a plurality of gas discharge ports, a flange portion at an opening thereof and a cylindrical supporting wall protruding toward the pressurized gas chamber on an annular surface of the flange portion, facing the pressurized gas chamber;

the cylindrical supporting wall obtained by integrating, in a thickness direction, an outer cylindrical wall portion and an inner cylindrical wall portion which is lower than the outer cylindrical wall portion, including an inner annular stepped surface formed by a level difference between the outer cylindrical wall portion and an inner cylindrical wall portion;

a first rupturable plate blocking a first communication passage between the pressurized gas chamber and the combustion chamber;

a second rupturable plate blocking a second communication passage between the pressurized gas chamber and the diffuser portion;

a cup member accommodating a filter, disposed in the pressurized gas chamber to directly face the second rupturable plate from the inside of the pressurized gas chamber, the cup member including a bottom surface having a plurality of communication holes serving as a gas passage and a peripheral surface, the cup member being provided such that a peripheral edge portion of the bottom surface is abutted against the inner annular stepped surface of the cylindrical supporting wall, and an annular portion of a peripheral surface close to a bottom surface is abutted against an inner peripheral surface of the outer cylindrical wall portion, and the filter having a first end surface abutted against the bottom surface of the cup member, a peripheral surface of the filter abutted against the peripheral surface of the cup member, an outer peripheral edge portion of a second end surface fixed by inwardly bending a claw portion formed on the peripheral surface at an opening of the cup member; and the filter allowing, during actuation, combustion gas from the combustion chamber and pressurized gas to pass therethrough and be discharge therefrom when the second rupturable plate is broken.

In other words, the aspect 4 is a preferable aspect of the aspect 1 of invention for the gas generator wherein the diffuser portion is in a cap-like shape including a closed end surface, a peripheral surface having a plurality of gas discharge ports, a flange portion at an opening thereof, and a cylindrical supporting wall protruding toward the pressurized gas chamber on an annular surface of the flange portion, facing the pressurized gas chamber, the cylindrical supporting wall is obtained by integrating, in a thickness direction, an outer cylindrical wall portion and an inner cylindrical wall portion which is lower than the outer cylindrical wall portion, and includes an inner annular stepped surface formed by a level difference between the outer cylindrical wall portion and an inner cylindrical wall portion, a cup member accommodating a filter, is disposed in the pressurized gas chamber to directly face the second rupturable plate from an inside of the pressurized gas chamber, the cup member includes a bottom surface having a plurality of communication holes serving as a gas passage, the cup member is provided such that, a peripheral edge portion of the bottom surface is abutted against the inner annular stepped surface of the cylindrical supporting wall and an annular portion of a peripheral surface close to a bottom surface is abutted against an inner peripheral surface of the outer cylindrical wall portion, and the filter includes a first end surface abutted against the bottom surface of the cup member and a peripheral surface abutted against the peripheral surface of the cup member, an outer peripheral edge portion of a second end surface of the filter is fixed by inwardly bending a claw portion formed on the peripheral surface at an opening of the cup member.

Aspect 5 of the invention provides, a gas generator inflating an air bag with combustion gas generated by combustion of a gas generating agent and pressurized gas, the gas generator including:

a pressurized gas chamber having an outer shell formed by a cylindrical pressurized gas chamber housing, being filled with the pressurized gas;

a combustion chamber connected to a first end portion of the pressurized gas chamber and including an ignition device and a gas generating agent accommodated in a combustion chamber housing;

a diffuser portion connected to a second end portion of the pressurized gas chamber, being in a cap-like shape including a closed end surface, a peripheral surface having a plurality of gas discharge ports, a flange portion at an opening thereof and a cylindrical supporting wall protruding toward the pressurized gas chamber on an annular surface of the flange portion, facing the pressurized gas chamber;

a first rupturable plate blocking a first communication passage between the pressurized gas chamber and the combustion chamber;

a second rupturable plate blocking a second communication passage between the pressurized gas chamber and the diffuser portion;

a cup member supporting a cylindrical filter, disposed in the pressurized gas chamber to cover the second rupturable plate from the inside of the pressurized gas chamber, including a bottom surface, a peripheral surface having a plurality of communication holes serving as a gas passage, a flange portion, an annular wall portion extending from the flange portion in the same direction as the peripheral surface and abutted against an outer peripheral surface of the cylindrical supporting wall, and an outer annular surface of the flange portion abutted against an annular top portion at a tip of the cylindrical supporting wall; and the cylindrical filter including an inner peripheral surface abutted, from the outside, against the peripheral surface of the cup member having a plurality of the communication holes, an outer peripheral surface facing the cylindrical pressurized gas chamber housing, a first annular bottom surface, on the side of the diffuser portion, abutted against an inner annular surface of the flange portion of the cup member, allowing, during actuation, combustion gas from the combustion chamber and pressurized gas to pass therethrough and be discharge therefrom when the second ruptruable plate is broken.

In other words, the aspect 5 is a preferable aspect of the aspect 1 of invention for the gas generator wherein, the diffuser portion is in a cap-like shape including a closed end surface, a peripheral surface having a plurality of gas discharge ports, a flange portion at an opening thereof, and a cylindrical supporting wall protruding toward the pressurized gas chamber on an annular surface of the flange portion, facing the pressurized gas chamber;

a cup member includes a bottom surface, a peripheral surface having a plurality of communication holes serving as a gas passage, a flange portion, and an annular wall portion extending from the flange portion in the same direction as the peripheral surface, an outer annular surface of the flange portion abutted against an annular top portion at a tip of the cylindrical supporting wall, and the filter is cylindrical in shape and includes an inner peripheral surface abutted, from the outside, against the peripheral surface of the cup member, an outer peripheral surface facing the cylindrical pressurized gas chamber housing, a first annular bottom surface, on a side of the diffuser portion, abutted against an inner annular surface of the flange portion of the cup member.

BRIEF DESCRIPTION OF DRAWINGS

The present invention will become more fully understood from the detailed description given hereinbelow and the accompanying drawings which are given byway of illustration only, and thus are no limitative of the present invention and wherein:

FIG. 2 shows, in (a), a partial sectional view for describing an attachment of a filter in the gas generator shown in FIG. 1 and, in (b), a sectional view of the filter used in (a) in FIG. 2;

DETAILED DESCRIPTION OF INVENTION

With the gas generator disclosed in DE-U No. 202005008938, the filter 24 is disposed outside the bottle filled with pressurized gas. As a result, the size of the entire gas generator is increased by the size of the filter 24. In addition, since the filter 24 is disposed at a position adjacent to the outlet opening 20 and gas discharged from the opening 20 concentrates toward the filter 24, it is conceivable that the filter 24 is subjected to a significant load and sufficient cooling efficiency cannot be secured.

The present invention provides a gas generator which has high cooling efficiency of gas discharged during actuation, is capable of arresting combustion residue and provides stable output performance.

In the gas generator according to the present invention, a gas flows as follows during actuation.

Combustion gas generated in the combustion chamber breaks the first rupturable plate, passes through the first communication passage, and flows into the pressurized gas chamber to increase temperature and pressure of gas inside the pressurized gas chamber.

The increase in internal pressure enables the second rupturable plate to be broken promptly. After the second rupturable plate is broken, the gas passes through the second communication passage and is discharged from the gas discharge port of the diffuser portion.

Therefore, the flow of gas during actuation is a flow from the combustion chamber at an upstream-side toward the diffuser portion at a downstream-side.

Since the filter covers the second rupturable plate in the pressurized gas chamber, the filter is disposed on the downstream side in the pressurized gas chamber.

If the filter is positioned to cover the first rupturable plate, combustion gas that has passed through the first communication passage from the combustion chamber is cooled by the filter. As a result, the gas pressure in the pressurized gas chamber cannot be sufficiently increased and breakage of the second rupturable plate may be delayed.

However, with the gas generator according to the present invention, since combustion gas that has passed through the first communication passage from the combustion chamber directly enters the pressurized gas chamber and passes through the filter after sufficiently increasing internal pressure, the pressure in the pressurized gas chamber is promptly increased and the second rupturable plate is promptly broken to open the second communication passage.

In addition, the combustion gas and the pressurized gas are cooled by the filter before entering the second communication passage and are discharged from the gas discharge port after combustion residue (metal components) in the gas and fragments of the first rupturable plate are filtered.

By disposing the filter in the pressurized gas chamber in this manner, the entire gas generator can be downsized as compared to that with the filter disposed outside the bottle as disclosed in DE-U No. 202005008938.

In addition, since pressurized gas has also penetrated into the filter, the filter can also be used as a gas filling space in the pressurized gas chamber.

Since the filter covers the second rupturable plate and the second rupturable plate blocks the second communication passage, a size of a cross section of the filter (a cross sectional area Df), a size (cross section) of the second rupturable plate (Dr), and a cross section of the second communication passage (a cross sectional area Dp) satisfy a relationship expressed as $Df > Dr > Dp$.

When a peripheral edge portion of the second rupturable plate is fixed to the diffuser portion by welding or the like, since Dr represents a size including the peripheral edge portion of the second rupturable plate, $Dr > Dp$ is satisfied. However, when the second rupturable plate is integrally formed with the diffuser portion and or like, $Df > Dr \geq Dp$ is satisfied.

Thereby, when gas present in the pressurized gas chamber (pressurized gas and combustion gas) passes through the filter and flows into the second communication passage, a flow rate of the gas into the second communication passage increases.

Accordingly, since, during actuation, the filter is pressed against the diffuser portion, the filter need to be attached to an extent that the filter does not detach from the diffuser portion prior to actuation. Therefore, fixing work such as welding is not required and the gas generator can be readily assembled.

A method of attaching the filter in the pressurized gas chamber is not particularly limited, and examples of applicable methods include:

adjusting an outer diameter dimension of the filter and an inner diameter dimension of the pressurized gas chamber housing to fix the filter by press-inserting into the pressurized gas chamber housing;

providing the filter with a flange portion, adjusting an outer diameter dimension of the flange portion and an inner diameter dimension of the pressurized gas chamber housing, and fixing the filter by press-inserting at the flange portion; and providing the filter with a flange portion and abutting the flange portion against an inner peripheral surface of the pressurized gas chamber, pressing the pressurized gas chamber housing in part opposing radially the abutted portion from the outside to form a protruding portion protruding inward, and pressing down the flange portion with the protruding portion.

When the filter is attached in this manner, the filter may be abutted against the diffuser portion facing the pressurized gas chamber or may be disposed at an interval therefrom.

In addition, the filter may be abutted against a fixing portion (a welded portion) of the second rupturable plate to the diffuser portion or may be disposed at an interval therefrom.

A example of the filter can include a filter that is a laminate obtained by winding a plain woven wire mesh, expanded metal, punched metal (perforated metal), or the like a plurality of times, a filter obtained by compression-molding a woven wire mesh, a filter that is a laminate obtained by winding a single wire a plurality of times, a filter obtained by compressing laminated crimped wires, or a coolant that is disclosed in paragraphs [0025] to [0027] and illustrated in FIGS. 1 to 5 in JP-A No. 10-119705.

A crimped wire is a wire that is contracted in a corrugated manner in a longitudinal direction. An example of a crimped wire is disclosed in paragraph [0021] in JP-A No. 2013-507540 and is available from N. V. Bekaert S. A., Zwevegem, Belgium under the trade name High Impact Steel.

As a compression-molded body (a filter) using crimped wires, for example, a compression-molded body (a filter) manufactured according to a manufacturing method disclosed in JP-A No. 7-308726 can be used. With a compression-molded filter using crimped wires, intricate intertwining of the crimped wires enhances rigidity as a filter and uniform formation of internal porosity increases uniformity of density. As a result, a gas generator with stable performance is obtained.

In addition, the filter may be a cylindrical filter having a through hole from one end surface to another end surface at a central portion thereof or may be a columnar or planar filter without a through hole.

A sectional shape of the filter is not particularly limited.

A preferable feature 1-2 of aspect 1 is the gas generator of aspect 1, wherein the second communication passage is blocked by the second rupturable plate having a peripheral edge portion fixed to a diffuser portion surface facing the pressurized gas chamber, and the filter is attached such that a first end surface thereof is disposed at a distance from a portion of the second rupturable plate at least excluding the peripheral edge portion, a second end surface thereof faces an inside of the pressurized gas chamber, and a peripheral surface thereof is opposed, with a gap, toward an inner peripheral surface of the pressurized gas chamber housing.

When the side surface and the second end surface, being the opposite end surface to the diffuser portion, of the filter are in an opened state instead of being in contact with other members, a contact area with gas increases and inflow of gas occurs more readily.

Moreover, while the second rupturable plate is a disk prior to being attached, the second rupturable plate deforms in a bowl-like shape toward the diffuser portion under pressure in the pressurized gas chamber after being attached.

Therefore, since the filter is completely out of contact with the second rupturable plate, the filter is prevented from damaging the second rupturable plate even when vibration is applied from the outside.

A preferable feature 1-3 of aspect 1 is the gas generator of aspect 1, wherein the diffuser portion has a filter attaching portion including either one of an annular protruding portion and a plurality of independent protruding portions which protrude from a portion thereof facing the pressurized gas chamber, and the filter is fixed by having the peripheral surface pressed from an outside toward an inside by the filter attaching portion.

A preferable feature 1-4 of aspect 1 is the gas generator of aspect 1, wherein the diffuser portion has a filter attaching portion including either one of an annular protruding portion and a plurality of independent protruding portions which protrude from a portion thereof facing the pressurized gas chamber, the filter has either one of an annular groove and a plurality of concave portions on a peripheral surface thereof, and the filter is attached by the filter attaching portion fitted to one of the annular groove and the plurality of concave portions on the peripheral surface of the filter.

In features 1-3 and 1-4, the filter is attached using the filter attaching portion protruding from the diffuser portion.

A preferable feature 1-5 of aspect 1 is the gas generator of aspect 1, wherein the diffuser portion has a protruding portion at a portion thereof facing the pressurized gas chamber, a cup member accommodating the filter is disposed so as to cover the second rupturable plate from an inside of the pressurized gas chamber, the cup member includes a flange portion at an opening portion thereof and is provided with an opening serving as a gas passage on at least one of a side surface and a bottom surface thereof, and the cup member is fixed by the flange portion pressed against the diffuser portion with the protruding portion of the diffuser portion.

In feature 1-5, the cup member is attached to the diffuser portion with the filter accommodated therein.

During assembly, since the cup member is attached with the filter accommodated in the inside thereof, the filter is prevented from being damaged.

A preferable feature 1-6 of aspect 1 is the gas generator of aspect 1, wherein the cylindrical pressurized gas chamber housing includes a uniform diameter portion with a uniform inner diameter and a minimum inner diameter portion formed at least at an opening on a side of the diffuser portion, an inner peripheral surface of the cylindrical pressurized gas chamber housing includes an inclined surface portion with an inner diameter that continuously decreases from the uniform diameter portion toward the minimum inner diameter portion, the filter is press-inserted at the minimum inner diameter portion, and a clearance is formed between the inclined surface portion and the filter.

A preferable feature 1-7 of aspect 1 is the gas generator of aspect 1, wherein the cylindrical pressurized gas chamber housing includes a uniform diameter portion with a uniform inner diameter and a minimum inner diameter portion formed at least at an opening on a side of the diffuser portion, an inner peripheral surface of the cylindrical pressurized gas chamber housing includes an inclined surface portion with an inner diameter that continuously decreases from the uniform diameter portion toward the minimum inner diameter portion, a cup member which accommodates the filter and includes an opening serving as a gas passage is press-inserted at the minimum inner diameter portion, and a clearance is formed between the inclined surface portion and a peripheral surface of the cup member.

The filter or the cup member can be press-fitted into the pressurized gas chamber housing by adjusting an inner shape and a dimension of the pressurized gas chamber housing and a dimension of the filter or the cup member.

In addition, by providing an inclined surface on the pressurized gas chamber housing, a clearance is formed between the filter peripheral surface or the cup member peripheral surface and the inclined surface.

Accordingly, the filter or the cup member can be readily attached and, at the same time, a sufficient gas inflow area can be secured.

In aspect 2, the cup member is attached to the diffuser portion with the filter accommodated therein.

During assembly, since the cup member is attached with the filter accommodated in the inside thereof, the filter is prevented from being damaged.

In aspect 2, the diffuser portion includes the cylindrical supporting wall protruding toward the pressurized gas chamber on an annular surface of the diffuser portion.

In addition, since the first end surface of the filter accommodated in the cup member is abutted against the cylindrical supporting wall and the second end surface of the filter is fixed at the bottom surface of the cup member, the filter is more firmly fixed and the interval between the first end surface and the second rupturable plate can be increased as compared to the inventions, aspects or preferable features described earlier.

Therefore, even in a case where wires that are components of the filter become frayed due to pressure of a gas flow passing through the filter during actuation, normal breakage of the second rupturable plate is not adversely affected.

Moreover, while the known filters described earlier can be used as the filter, a filter obtained by laminating crimped wires in a mold so as to acquire a predetermined shape (normally, a columnar or cylindrical shape) and subsequently performing compression-molding on the crimped wires is particularly favorable due to high rigidity and a high tolerance toward fraying.

In the gas generator according to the present invention, a gas flows as follows during actuation.

Combustion gas generated in the combustion chamber breaks the first rupturable plate, passes through the first communication passage, and flows into the pressurized gas chamber to increase temperature and pressure of gas inside the pressurized gas chamber.

The increase in internal pressure enables the second rupturable plate to be broken promptly. After the second rupturable plate is broken, the gas passes through the second communication passage and is discharged from the gas discharge port of the diffuser portion.

Therefore, the flow of gas during actuation is a flow from the combustion chamber at an upstream-side toward the diffuser portion at a downstream-side.

Since the filter covers the second rupturable plate in the pressurized gas chamber, the filter is disposed on the downstream side in the pressurized gas chamber.

If the filter is positioned to cover the first rupturable plate, combustion gas that has passed through the first communication passage from the combustion chamber is cooled by the filter. As a result, the gas pressure in the pressurized gas chamber cannot be sufficiently increased and breakage of the second rupturable plate may be delayed.

However, with the gas generator according to the present invention, since combustion gas that has passed through the first communication passage from the combustion chamber directly enters the pressurized gas chamber and passes through the filter after sufficiently increasing internal pressure, the pressure in the pressurized gas chamber is promptly increased and the second rupturable plate is promptly broken to open the second communication passage.

In addition, the combustion gas and the pressurized gas are cooled by the filter before entering the second communication passage and are discharged from the gas discharge port after combustion residue (metal components) in the gas and fragments of the first rupturable plate are filtered.

By disposing the filter in the pressurized gas chamber in this manner, the entire gas generator can be downsized as compared to that with the filter disposed outside the bottle as disclosed in DE-U No. 202005008938.

In addition, since pressurized gas has also penetrated into the filter, the filter can also be used as a gas filling space in the pressurized gas chamber.

In aspect 3, the cup member is attached to the diffuser portion with the filter accommodated in the cup member in a similar manner to the invention according to aspect 2.

The first end surface of the filter is abutted against the cylindrical supporting wall via the perforated plate member and the second end surface of the filter is retained on the bottom surface of the cup member.

Therefore, wires that are components of the filter are less likely to become frayed due to pressure of a gas flow passing through the filter during actuation, and normal breakage of the second rupturable plate is not adversely affected. In addition, the filter itself is firmly fixed.

Moreover, while the known filters described earlier can be used as the filter, the filter (coolant) disclosed in paragraphs [0025] to [0027] and illustrated in FIGS. 1 to 5 in JP-A No. 10-119705 is favorable.

In aspect 4, the cup member is attached to the diffuser portion with the filter accommodated in the cup member. However, in aspect 4, an attached state of the cup member is in an opposite direction as compared to the inventions described earlier.

In aspect 4, since the cup member accommodating the filter is attached to the cylindrical supporting wall of the diffuser portion so that the bottom surface thereof is on the side of the second rupturable plate, the bottom surface of the cup member functions in a similar manner to the perforated plate member in aspect 3.

Therefore, in addition to the filter being sufficiently fixed, wires that are components of the filter are less likely to become frayed due to pressure of a gas flow passing through the filter during actuation, and normal breakage of the second rupturable plate is not adversely affected.

Moreover, while the known filters described earlier can be used as the filter, the filter (coolant) that is described in paragraphs [0025] to [0027] and illustrated in FIGS. 1 to 5 in JP-A No. 10-119705 is particularly favorable.

In aspect 5, a diffuser portion including a cylindrical supporting wall, a cup member with a specific shape, and a cylindrical filter are combined in such a manner that the cup member is set inside and the cylindrical filter is set outside.

In aspect 5, the cup member functions in a similar manner to the perforated plate member in aspect 3.

Therefore, wires that are components of the filter are less likely to become frayed due to pressure of a gas flow passing through the filter during actuation, and normal breakage of the second rupturable plate is not adversely affected.

Moreover, while the known filters described earlier can be used as the filter, a filter that is a laminate obtained by winding expanded metal, punched metal, or the like a plurality of times is favorable.

With the gas generator according to the present invention, since the filter is disposed in the pressurized gas chamber, combustion residue of a gas generating agent is readily arrested.

In addition, since the filter is disposed on a downstream side (a side of the second rupturable plate) in the pressurized gas chamber, pressure in the pressurized gas chamber is increased by an inflow of combustion gas, the second rupturable plate can be broken in a prompt and reliable manner, and gas to be discharged from the gas discharge port can be cooled and cleaned. Furthermore, since the filter is less affected by the flow of gas, stable output performance is obtained.

Description of Embodiments

Figure 1:
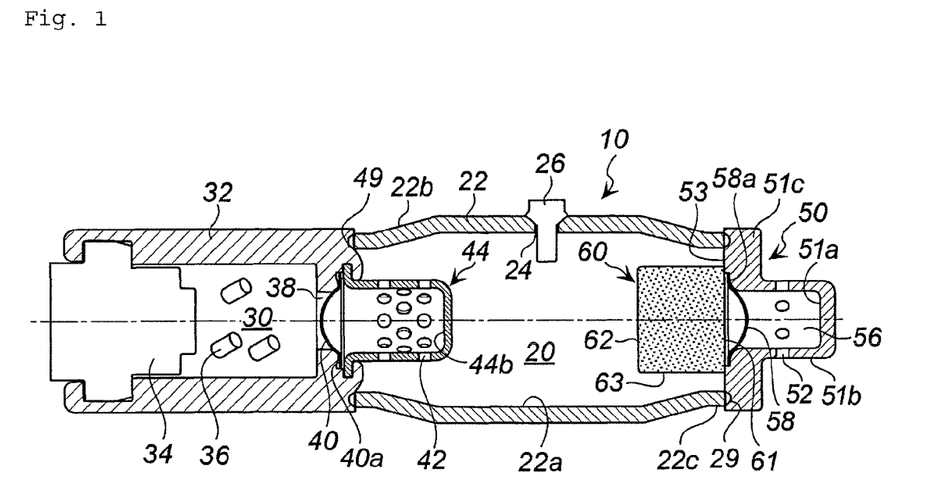
FIG. 1 shows a sectional view of a gas generator in the axial direction.

Embodiments will be explained with reference to FIG. 1. FIG. 1 is a sectional view of a gas generator in an axial direction.

A gas generator 10 includes a pressurized gas chamber 20, a combustion chamber 30, and a diffuser portion 50.

The pressurized gas chamber 20 has an outer shell formed by a cylindrical pressurized gas chamber housing 22 and is filled with pressurized gas including a mixture of argon and helium.

In the cylindrical pressurized gas chamber housing 22, a vicinity of a central portion in the axial direction has a uniform diameter (a uniform diameter portion in which an inner diameter and an outer diameter are uniform), a minimum inner diameter portion 22c is provided at both end openings, and an inclined surface portion 22b are provided between the uniform diameter portion and the minimum inner diameter portions. Note that a cylindrical pressurized gas chamber housing 22 with a uniform diameter, having no inclined surface portion can also be used.

A pressurized gas filling hole 24 is formed on a side surface of the pressurized gas chamber housing 22, and the pressurized gas filing hole 24 is closed by a pin 26 after filling of the pressurized gas.

The combustion chamber 30 is formed such that a combustion chamber housing 32 is connected by resistance welding at a connecting portion 49 on a side of a first end portion (an end portion on the side of a first rupturable plate 40) of the pressurized gas chamber housing 22.

An ignition device (an electrical igniter) 34 and a gas generating agent 36 are accommodated in the combustion chamber 30.

When the gas generator 10 is incorporated into an air bag system, the ignition device 34 is connected to an external power source via a connector and a lead wire.

An example of the gas generating agent 36 can be the one (with a discharged gas temperature of 700 to 1630° C.) including 34% by mass of nitroguanidine as fuel, 56% by mass of strontium nitrate as an oxidizing agent, and 10% by mass of sodium carboxymethylcellulose as a bonding agent. A combustion residue generated when the gas generating agent 36 of the above composition is burnt is strontium oxide (with a melting point of 2430° C.). Therefore, the combustion residue is solidified in a lump shape (a slag shape) without reaching a molten state.

A first communication passage 38 between the pressurized gas chamber 20 and the combustion chamber 30 is blocked by the first rupturable plate 40, and the inside of the combustion chamber 30 is maintained at a normal pressure. The first rupturable plate 40 is resistance-welded to the combustion chamber housing 32 at a peripheral edge portion 40a.

The first rupturable plate 40 is covered by a cap 44 having gas discharge ports 42 from the side of the pressurized gas chamber 20. The cap 44 is attached such that, by covering the first rupturable plate 40, combustion gas generated by combustion of the gas generating agent 36 is necessarily ejected from the gas discharge ports 42 after passing through the cap 44.

The cap 44 is used in the gas generator 10 shown in FIG. 1, but since a filter 60 is provided in the present invention, the cap 44 need not necessarily be used.

The diffuser portion 50 including gas discharge ports 52 that discharge pressurized gas and combustion gas, is connected to a second end portion (an end portion on the side of a second rupturable plate 58) of the pressurized gas chamber 20.

The diffuser portion 50 has a cap-like shape including a closed end surface 51*a* and a peripheral surface 51*b* and also a flange portion 51*c* at the opening.

The diffuser portion 50 is provided with a plurality of gas discharge ports 52 that allow passage of gas, on the peripheral surface 51*b*.

The diffuser portion 50 and the pressurized gas chamber housing 22 are resistance-welded to each other at a connecting portion 29.

The diffuser portion 50 and the pressurized gas chamber housing 22 are connected such that respective central axes thereof coincide with each other.

A second communication passage 56 between the pressurized gas chamber 20 and the diffuser portion 50 is blocked by the second rupturable plate 58, and the inside of the diffuser portion 50 is maintained at a normal pressure.

A peripheral edge portion 58*a* of the second rupturable plate 58 is resistance-welded to an annularly recessed portion at the inner peripheral edge of an annular surface (a diffuser portion surface) 53, facing the pressurized gas chamber 20, in the flange portion 51*c*.

The filter 60 is disposed in the pressurized gas chamber 20 at a position for covering the second rupturable plate 58.

At the time of actuation, the filter 60 allows passage of combustion gas and pressurized gas to be discharged from the gas discharge ports 52 through the second communication passage 56 and, during this process, the filter 60 performs known functions, as a filter for gas generator, that cools and filters gas.

A sectional shape of the filter 60 is not particularly limited and can be, for example, a columnar shape similar to an inner sectional shape of the pressurized gas chamber 20.

One end surface (a first end surface) 61 of the filter 60 directly faces the second rupturable plate 58 and another end surface 62 (a second end surface) faces the inside of the pressurized gas chamber 20. At this point, the one end surface 61 is separated from the peripheral edge portion 58*a* of the second rupturable plate 58. In addition, a peripheral surface (a side surface) 63 directly opposes an inner peripheral surface 22*a* of the pressurized gas chamber housing 22 with a gap.

The one end surface 61 of the filter 60 has a greater area than the entire second rupturable plate 58 (including a welded portion to the diffuser portion surface 53).

Since the filter 60 is made of a laminate of a wire mesh or a metal wire (for example, a crimped wire) or a compression-molded body of such a laminate, pressurized gas has penetrated into the filter 60 and pressure inside the filter 60 is equal to pressure in the pressurized gas chamber 20.

In this manner, since the filter 60 itself can also be used as a gas space, a volume of the filter 60 does not directly equate to a reduced amount of a gas filling space.

The filter 60 needs only to be attached in the pressurized gas chamber 20 prior to actuation to an extent that the filter 60 does not move.

Desirably, the filter 60 is attached to the diffuser portion 50, or the filter 60 is abutted against the diffuser portion 50, from the perspective of not blocking the flow of gas during actuation.

Hereinafter, attachment of the filter 60 to the diffuser portion 50 will be described with reference to FIGS. 2 to 5.

Figure 2:
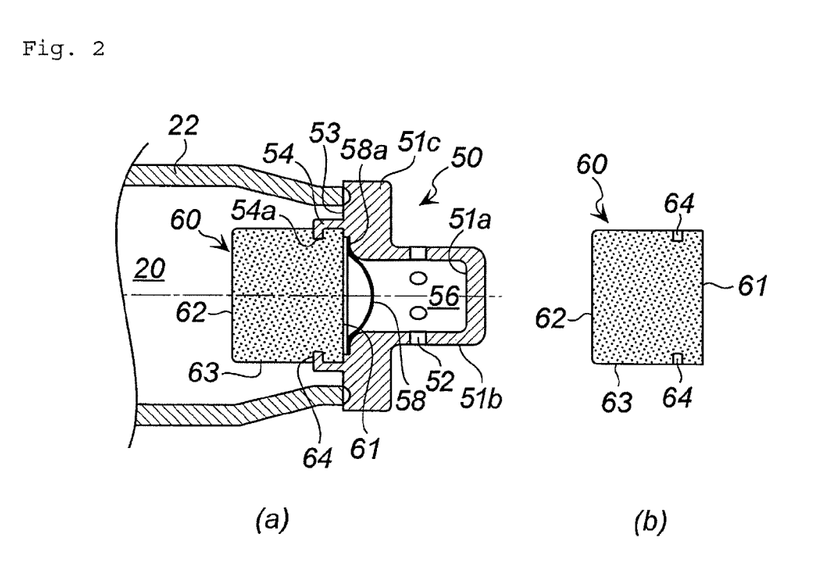

<Attached State Shown in FIG. 2>

FIG. 2 shows an embodiment of the gas generator 10 shown in FIG. 1 in which the filter 60 is attached as shown in (a) in FIG. 2.

The filter 60 shown in (b) in FIG. 2 has a columnar shape and a density of around 1 to 5 g/cm$^3$.

Although the filter 60 is provided such that the first end surface 61 opposes with a small gap to the peripheral edge portion (the welded portion) 58*a* of the second rupturable plate 58, the first end surface 61 may be attached to the peripheral edge portion (the welded portion) 58*a*, depending on the welded state. The second end surface 62 faces the inside of the pressurized gas chamber 20.

Since the second rupturable plate 58 is deformed in a bowl-like shape toward the diffuser portion 50 under the pressure in the pressurized gas chamber 20, a larger interval exists between the second rupturable plate 58 excluding the peripheral edge portion 58*a* and the first end surface 61 than that between the peripheral edge portion 58*a* and the first end surface 61.

Therefore, even when the gas generator mounted to a vehicle is subjected to vibration, the second rupturable plate 58 excluding the peripheral edge portion (a portion to be broken during actuation) is prevented from being damaged by the first end surface 61.

The peripheral surface 63 includes an annular groove 64 or a plurality of independent concave portions 64 disposed at equal intervals, and the peripheral surface 63 is opposed with a gap to the inner peripheral surface 22*a* of the pressurized gas chamber housing 22.

The diffuser portion surface 53 includes a protruding portion (filter attaching portion) 54 that is extended toward the pressurized gas chamber 20.

A tip portion 54*a* of the protruding portion 54 is bent inward.

When the filter peripheral surface 63 includes the annular groove 64, the protruding portion 54 is an annular protrusion or a plurality of protrusions, and when the peripheral surface 63 of the filter 60 includes the plurality of concave portions 64, the protruding portion 54 is a plurality of independent protrusions existing at respectively corresponding positions.

The filter 60 is attached, located at a predetermined position, with the annular groove (or the concave portions) 64 thereof pressed by the protruding portion 54.

The filter 60 shown in FIG. 2 includes the annular groove (or the concave portions) 64. However, a peripheral surface 63 without the annular groove (or the concave portions) 64 may be provided, and the filter 60 may be attached by the protruding portion 54 pressing inward the filter peripheral surface 63 from the outside (pressing so that the protruding portion 54 bites into the filter peripheral surface 63 or the filter deforms).

In the embodiment shown in FIG. 2 as well as the other embodiments described below (FIGS. 3 to 6), a size of a cross section of the filter 60 (a cross sectional area Df), a size (a cross section) of the second rupturable plate 58 (including the welded peripheral edge portion 58*a*) (Dr) and a size of a cross section of the second communication passage 56 (a cross sectional area Dp) satisfy a relationship expressed as Df>Dr>Dp.

Figure 3:
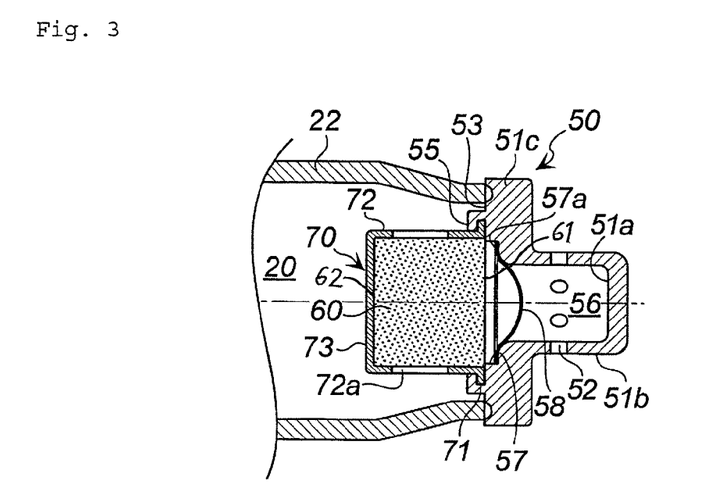
FIG. 3 shows a partial sectional view for describing an attachment of a filter of a gas generator according to another embodiment.

<Attached State Shown in FIG. 3>

FIG. 3 shows an embodiment of the gas generator 10 shown in FIG. 1 in which the filter 60 is attached in combination with a cup member 70 as shown in FIG. 3.

The filter 60 shown in FIG. 3 has a columnar shape or a cylindrical shape and a density of around 1 to 5 g/cm$^3$.

The first end surface 61 is abutted against the flange portion annular surface 53 that corresponds to a diffuser portion surface, and the second end surface 62 faces the inside of the pressurized gas chamber 20.

The cup member 70 has a size and a shape that enable the filter 60 to be accommodated therein, and a flange portion 71, whose diameter is enlarged radially outward, is provided at an opening portion of the cup member 70.

An opening 72a serving as a gas passage is provided on a peripheral surface 72 of the cup member 70. One or two or more openings 72a may be provided. A bottom surface 73 of the cup member 70 can also be provided with an opening. When a cylindrical filter with a through hole is used, the opening 72a formed on the cup member is provided so as not to directly face the through hole of the filter.

A total opening area of the opening 72a is set larger than a sectional area of the second communication passage 56 and is adjusted so that no pressure loss occurs when gas passes through.

At an entrance from the pressurized gas chamber 20 to the second communication passage 56, the flange portion annular surface 53 includes an annular portion 57 with a larger inner diameter than the second communication passage 56 and an annular stepped surface 57a formed by a difference in inner diameters between the annular portion 57 and the second communication passage 56.

In addition, the peripheral edge portion 58a of the second rupturable plate 58 is fixed by welding to the annular stepped surface 57a. Therefore, since there is a sufficient gap between the second rupturable plate 58 and the first end surface 61, the second rupturable plate 58 including the peripheral edge portion 58a does not come into contact with the first end surface 61.

The diffuser portion surface 53 includes an annular protruding portion 55 which corresponds to a shape of the flange portion 71 of the cup member and that is extended toward the pressurized gas chamber 20.

In FIG. 3, the flange portion 71 of the cup member 70 accommodating the filter 60 is pressed by the annular protruding portion 55 whose tip portion is bent inward.

Figure 4:
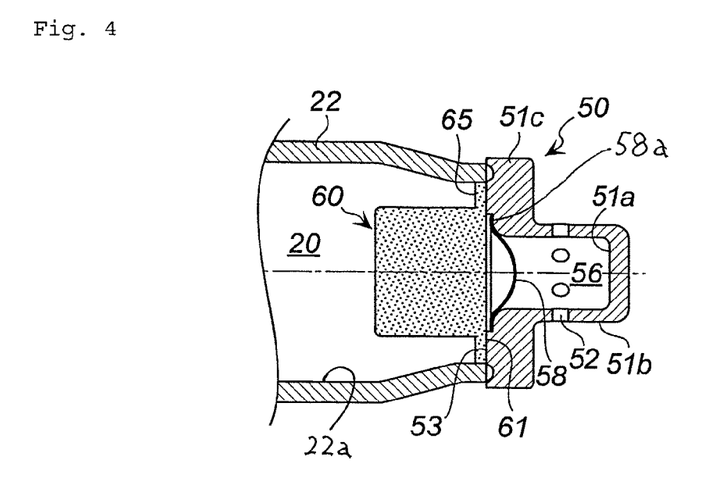
FIG. 4 shows a partial sectional view for describing an attachment of a filter of a gas generator according to yet another embodiment.

<Attached State Shown in FIG. 4>

FIG. 4 shows an embodiment of the gas generator 10 shown in FIG. 1 in which the filter 60 is attached as shown in FIG. 4.

The filter 60 shown in FIG. 4 has a columnar shape and includes a flange portion 65 with a diameter that is larger than that of the filter 60 at first end surface 61 (the filter 60 has a density of around 1 to 5 g/cm³).

The first end surface 61 is abutted against the diffuser portion surface 53, and the second end surface 62 faces the inside of the pressurized gas chamber 20.

An outer diameter of the flange portion 65 of the filter is adjusted so as to be slightly larger than an inner diameter of the inner peripheral surface 22a of the pressurized gas chamber housing directly facing the flange portion 65.

The filter 60 is attached such that the flange portion 65 is press-inserted into the pressurized gas chamber housing until the flange portion 65 abuts against the flange portion annular surface 53 (the peripheral edge portion 58a of the second rupturable plate).

Figure 5:
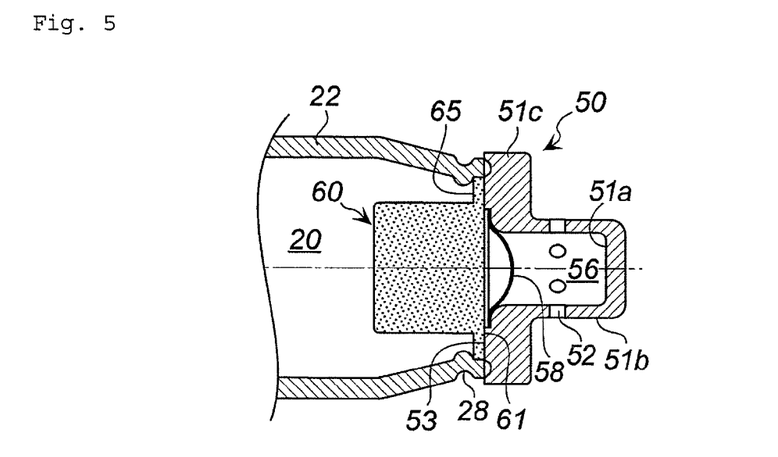
FIG. 5 shows a partial sectional view for describing an attached state of a filter of a gas generator according to yet another embodiment.

<Attached State Shown in FIG. 5>

FIG. 5 shows an embodiment of the gas generator 10 shown in FIG. 1 in which the filter 60 is attached as shown in FIG. 5.

The filter 60 shown in FIG. 5 has a columnar shape and includes a flange portion 65 with a diameter that is enlarged radially outward at the first end surface 61 (the filter 60 has a density of around 1 to 5 g/cm³).

The first end surface 61 is abutted against the diffuser portion surface 53, and the second end surface 62 faces the inside of the pressurized gas chamber 20.

An outer diameter of the flange portion 65 of the filter is adjusted to a degree which enables the flange portion 65 to abut against the inner peripheral surface 22a of the pressurized gas chamber housing 22 directly facing the flange portion 65.

The filter 60 is pressed in a thickness direction by a protruding portion (an annular protruding portion or a plurality of independent protruding portions) 28 formed by pushing an outer wall portion of the pressurized gas chamber housing 22 inward at a position where the flange portion 65 abuts against the flange portion annular surface 53 (the peripheral edge portion 58a of the second rupturable plate 58).

Figure 6:
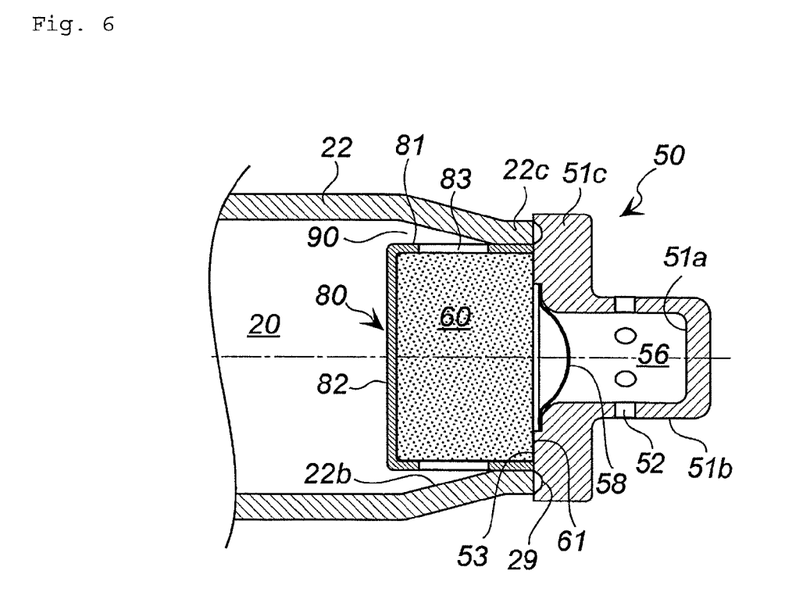
FIG. 6 shows a partial sectional view for describing an attachment of a filter of a gas generator according to yet another embodiment.

<Attached State Shown in FIG. 6>

FIG. 6 shows an embodiment of the gas generator 10 shown in FIG. 1 in which the filter 60 is attached in combination with a cup member 80 as shown in FIG. 6.

While a major portion of the pressurized gas chamber housing 22 including a central portion in an axial direction is a uniform diameter portion (uniform inner and outer diameters), a minimum inner diameter portion 22c is provided at openings of both ends, respectively.

In addition, a portion between the uniform diameter portion and the minimum inner diameter portion 22c is an inclined surface portion 22b in which an inner diameter continuously decreases toward the diffuser portion 50.

The filter 60 is accommodated in the cup member 80. The filter 60 is the same as that shown in FIG. 3.

The cup member 80 includes a peripheral surface 81 and a bottom surface 82, and an opening 83 serving as a gas passage is provided on the peripheral surface 81. Moreover, the bottom surface 82 can also be provided with an opening.

A total opening area of the opening 83 is set larger than a sectional area of the second communication passage 56 and is adjusted so that no pressure loss occurs when gas passes through.

An outer diameter of the cup member 80 is adjusted to be slightly larger than an inner diameter of the minimum inner diameter portion 22c.

In the cup member 80 accommodating the filter 60, a peripheral surface 81 at the opening portion is press-inserted to the minimum inner diameter portion 22c.

In addition, since a clearance 90 is formed between the cup member 80 (the opening 83) and the inclined surface portion 22b, a sufficient gas inflow space is secured.

Note that the filter 60 may be press-inserted to the minimum inner diameter portion 22c without using the cup member 80.

In addition, in the embodiment shown in FIG. 6, the diffuser portion 50 including the annular portion 57 and the annular stepped surface 57a shown in FIG. 3 can be used.

<Operations of Gas Generator Shown in FIG. 1 and (a) in FIG. 2>

Next, a description will be given on operations in a case where the gas generator 10 shown in FIG. 1 with the filter 60 attached thereto as shown in (a) in FIG. 2 is incorporated into an air bag system mounted to an automobile.

When an automobile collides and receives an impact, the ignition device 34 is actuated and ignited by an actuation signal outputting device to burn the gas generating agent 36 and generate a high temperature combustion gas.

Thereafter, the first rupturable plate 40 is broken by a pressure rise inside the combustion chamber 30 due to the high temperature combustion gas, and the combustion gas including combustion residue flows into the cap 44 to be ejected from the gas discharge ports 42 into the pressurized gas chamber 20.

Since the pressurized gas at this point flows out from the gas discharge ports 42 after striking against the closed end surface 44b of the cap 44 and changing its flow direction, foreign materials such as combustion residue and fragments of the first rupturable plate 40 more readily remain in a pocket portion defined from the closed end surface 44b to the gas discharge port 42 nearest to the closed end surface 44b.

Since the temperature of the combustion gas entering the pressurized gas chamber 20 from the combustion chamber 30 substantially has not decreased, the internal pressure of the pressurized gas chamber 20 rises rapidly.

In particular, since the filter 60 is disposed near the second rupturable plate 58 that is separated from the combustion chamber 30, it is conceivable that the combustion gas is less likely to be affected by the filter 60 and cooling of the combustion gas in the pressurized gas chamber 20 hardly occurs at the time the combustion gas is discharged to the pressurized gas chamber 20. Therefore, the pressure in the pressurized gas chamber 20 rises swiftly. In addition, at this point, a mixture of the combustion gas and pressurized gas has also penetrated into the filter 60.

Subsequently, when the internal pressure reaches a prescribed pressure, the second rupturable plate 58 is broken, the second communication passage 56 is opened, and gas is discharged from the gas discharge ports 52.

As described above, since the relationship expressed as Df>Dr>Dp is satisfied, when gas passes through the filter 60 and flows into the second communication passage 56 during the gas discharge process, a flow rate of the gas flowing into the second communication passage 56 increases.

As a result, the filter 60 is forcefully pushed against the diffuser portion surface 53 by the flow of gas, the position of the filter 60 does not shift during actuation even if, for example, the protruding portion 54 is dislodged from the groove 64.

Figure 7:
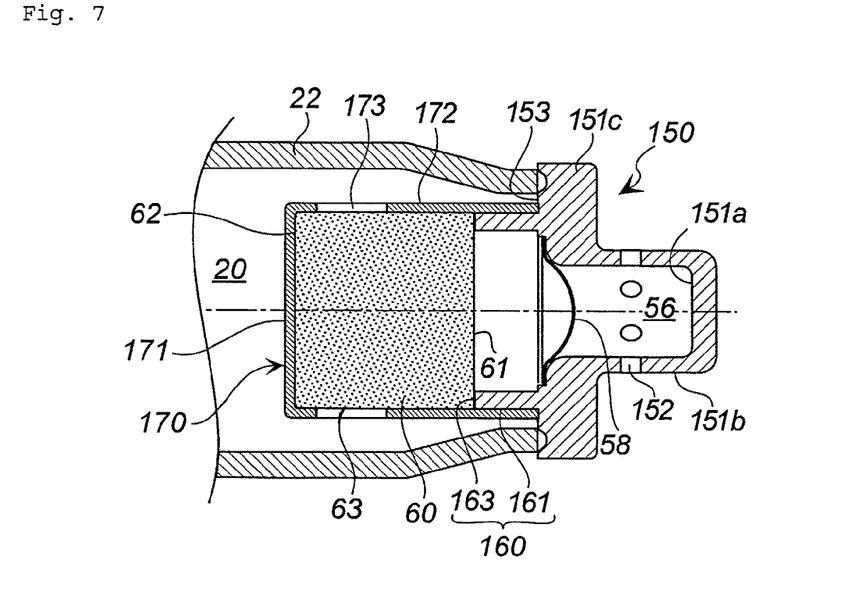
FIG. 7 shows a partial sectional view for describing an attachment of a filter of a gas generator according to yet another embodiment.

<Attached State Shown in FIG. 7>

FIG. 7 shows an embodiment of the gas generator 10 shown in FIG. 1 in which the filter 60 is attached in combination with a diffuser portion 150 and a cup member 170 as shown in FIG. 7. Moreover, portions not shown in FIG. 7 are the same as in FIG. 1.

The diffuser portion 150 has a cap-like shape including a closed end surface 151a and a peripheral surface 151b having a plurality of gas discharge ports 152, and includes a flange portion 151c at the opening thereof.

The diffuser portion 150 further includes a cylindrical supporting wall 160 protruding toward the pressurized gas chamber 20 on a flange portion annular surface 153 of the flange portion 151c, facing the pressurized gas chamber 20.

The second rupturable plate 58 blocks the second communication passage 56, between the pressurized gas chamber 20 and the diffuser portion 150.

A cup member 170 accommodating the filter 60 is disposed in the pressurized gas chamber 20 so as to cover the second rupturable plate 58 from the inside of the pressurized gas chamber 20.

The cup member 170 includes a bottom surface 171 and a peripheral surface 172 with a plurality of communication holes (openings) 173 serving as a gas passage. The communication holes 173 are formed in plurality at equal intervals in a peripheral direction only at positions near the bottom surface 171 of the cup member 170 so as to enable gas to pass through the entire filter 60.

The cup member 170 is fixed by being fitted to an outer peripheral surface 161 of the cylindrical supporting wall 160 from the outside. Moreover, the cup member 170 may be fixed by welding to the cylindrical supporting wall 160 or fixed by depressing the peripheral surface 172 of the cup member 170 from the outside to the inside with respect to an annular groove or a concave portion formed in advance on the outer peripheral surface 161 of the cylindrical supporting wall 160.

In the filter 60, the second end surface 62 is abutted against the bottom surface 171 of the cup member, the filter peripheral surface 63 is abutted against the cup member peripheral surface 172, and a peripheral edge portion of the first end surface 61 is abutted against an annular top portion 163 at a tip of the cylindrical supporting wall 160. While a length of the cylindrical supporting wall 160 is set approximately the same as a thickness of the flange portion 151c, the length of the cylindrical supporting wall 160 can be set longer than the thickness of the flange portion 151c.

Therefore, in the embodiment shown in FIG. 7, a gap between the first end surface 61 of the filter and the second rupturable plate 58 is set larger than that in the other embodiments (FIGS. 1 to 6) described earlier.

The filter 60 shown in FIG. 7 is obtained by laminating crimped wires in a columnar shape in a mold and subsequently performing compression-molding (the filter 60 has a density of around 1 to 5 g/cm$^3$). With the filter 60 formed of crimped wires, the crimped wires exist in the filter 60 in an intricately intertwined state. Therefore, the filter 60 is favorable in that the filter 60 does not become frayed even under pressure and there is no unevenness in density after compression-molding.

<Operations of Gas Generator Shown in FIG. 1 and FIG. 7>

Next, a description will be given on operations in a case where the gas generator 10 shown in FIG. 1 with the filter 60 attached thereto as shown in FIG. 7 is incorporated into an air bag system mounted to an automobile.

When an automobile collides and receives an impact, the ignition device 34 is actuated and ignited by an actuation signal outputting device to burn the gas generating agent 36 and generate a high temperature combustion gas.

Thereafter, the first rupturable plate 40 is broken by a pressure rise inside the combustion chamber 30 due to the high temperature combustion gas, and the combustion gas including combustion residue flows into the cap 44 to be ejected from the gas discharge ports 42 into the pressurized gas chamber 20.

Since the pressurized gas at this point flows out from the gas discharge ports 42 after striking against the closed end surface 44b of the cap 44 and changing its flow direction, foreign materials such as combustion residue and fragments of the first rupturable plate 40 more readily remain in a pocket portion defined from the closed end surface 44b to the gas discharge port 42 nearest to the closed end surface 44b.

Since the temperature of the combustion gas entering the pressurized gas chamber 20 from the combustion chamber 30 substantially has not decreased, the internal pressure of the pressurized gas chamber 20 rises rapidly.

In particular, since the filter 60 is disposed near the second rupturable plate 58 that is separated from the combustion chamber 30, it is conceivable that the combustion gas is less likely to be affected by the filter 60 and cooling of the combustion gas in the pressurized gas chamber 20 hardly occurs at the time the combustion gas is discharged to the pressurized gas chamber 20. Therefore, the pressure in the pressurized gas chamber 20 rises swiftly. In addition, at this point, a mixture of the combustion gas and pressurized gas has also penetrated into the filter 60.

Subsequently, when the internal pressure reaches a prescribed pressure, the second rupturable plate 58 is broken, the second communication passage 56 is opened, and gas is discharged from the gas discharge ports 52.

When gas is discharged in this manner, a mixture gas of the combustion gas and the pressurized gas passes through the filter 60 under high pressure (at high speed).

However, since the embodiment shown in FIG. 7 uses the filter 60 made of crimped wires, no fraying occurs even when subjected to high pressure. In particular, while a passage sectional area between the pressurized gas chamber 20 and the second communication passage 56 is narrow and wires of the filter are more susceptible to an effect of an increase in gas flow rate, the filter made of crimped wires is highly rigid and therefore less likely to be affected.

Figure 8:
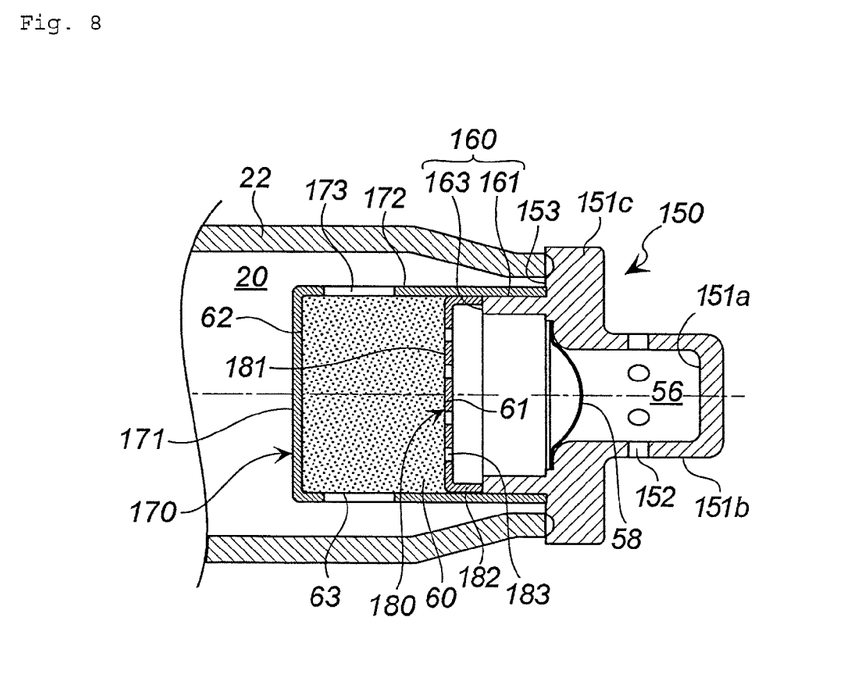
FIG. 8 shows a partial sectional view for describing an attachment of a filter of a gas generator according to yet another embodiment.

<Attached State Shown in FIG. 8>

FIG. 8 shows an embodiment of the gas generator 10 shown in FIG. 1 in which the filter 60 is attached in combination with the diffuser portion 150, the cup member 170, and a perforated plate member 180 as shown in FIG. 8. Moreover, portions not shown in FIG. 8 are the same as in FIG. 1.

The diffuser portion 150 has a cap-like shape including the closed end surface 151a and the peripheral surface 151b having the plurality of gas discharge ports 152, and includes the flange portion 151c at the opening.

The diffuser portion 150 further includes the cylindrical supporting wall 160 protruding toward the pressurized gas chamber 20 on the flange portion annular surface 153 of the flange portion 151c, facing the pressurized gas chamber 20.

The second rupturable plate 58 blocks the second communication passage 56, between the pressurized gas chamber 20 and the diffuser portion 150.

The cup member 170 accommodating the filter 60 is disposed in the pressurized gas chamber 20 so as to cover the second rupturable plate 58 from the inside of the pressurized gas chamber 20. As the filter 60, a columnar filter manufactured by applying the manufacturing method of the filter (coolant) that is described in paragraphs [0025] to [0027] and illustrated in FIGS. 1 to 5 in JP-A No. 10-119705 is used.

The cup member 170 includes the bottom surface 171 and the peripheral surface 172 with the plurality of communication holes (openings) 173 serving as a gas passage. The communication holes 173 are formed at positions near the bottom surface 171 of the cup member 170 so as to enable gas to pass through the entire filter 60.

The cup member 170 is fixed by being fitted to the outer peripheral surface 161 of the cylindrical supporting wall 160 from the outside. Moreover, the cup member 170 may be fixed by welding to the cylindrical supporting wall 160 or fixed by depressing the peripheral surface 172 of the cup member 170 from the outside to the inside with respect to an annular groove or a concave portion formed in advance on the outer peripheral surface 161 of the cylindrical supporting wall 160.

In the filter 60, the second end surface 62 is abutted against the bottom surface 171 of the cup member, the filter peripheral surface 63 is abutted against the cup member peripheral surface 172, and the first end surface 61 is abutted against a perforated plate member 180 including a plurality of communication holes 183 serving as a gas passage.

The perforated plate member 180 is abutted against the annular top portion 163 at a tip of the cylindrical supporting wall 160.

The perforated plate member 180 includes a bottom surface 181 having a plurality of communication holes 183 that penetrate in a thickness direction and an annular wall 182 extended, from an outer peripheral edge of the bottom surface 181, in the same direction as the communication holes 183. A disk including a plurality of communication holes 183 that penetrate in a thickness direction can also be used as the perforated plate member 180.

While a length of the cylindrical supporting wall 160 is set approximately the same as a thickness of the flange portion 151c, the length of the cylindrical supporting wall 160 can be set longer than the thickness of the flange portion 151c.

A thickness of the perforated plate member 180 is shorter than the length of the cylindrical supporting wall 160.

Therefore, in the embodiment shown in FIG. 8, a gap between the first end surface 61 of the filter and the second rupturable plate 58 is set larger than that in the other embodiments (FIGS. 1 to 6) described earlier.

When the gas generator 10 shown in FIG. 1 with the filter 60 attached thereto as shown in FIG. 8 is incorporated into an air bag system mounted to an automobile, similar operations to the gas generator 10 shown in FIG. 1 with the filter 60 attached thereto as shown in FIG. 7 are performed.

When a mixture gas of the combustion gas and the pressurized gas passes through the filter 60 under high pressure (at high speed) during actuation, since the perforated plate member 180 exists between the filter 60 and the second rupturable plate 58, fraying of the filter 60 is less likely to occur. In addition, since a breakage property of the second rupturable plate 58 is not adversely affected, performance of the gas generator stabilizes.

Figure 9:
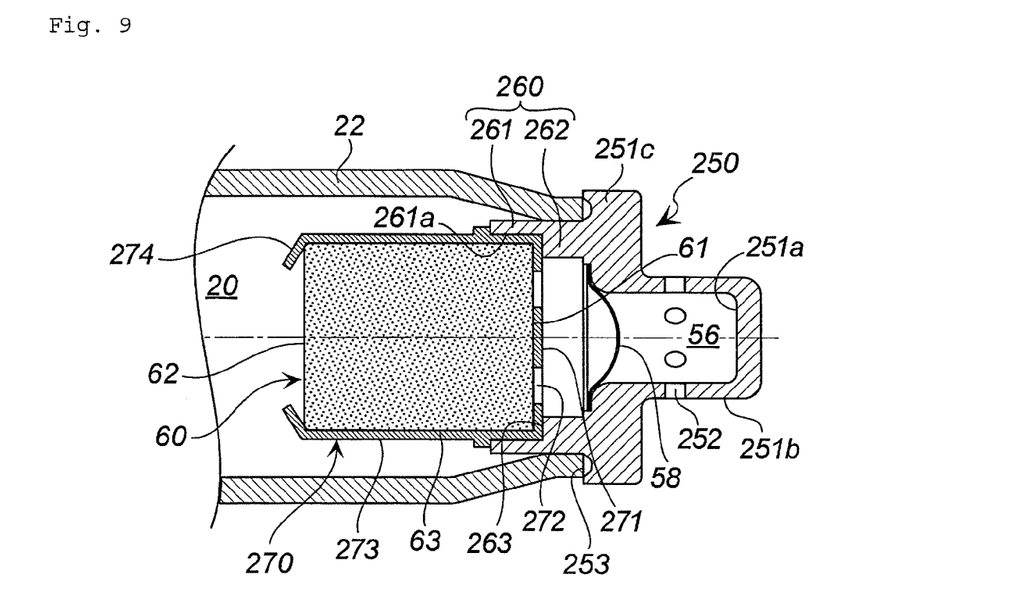
FIG. 9 shows a partial sectional view for describing an attachment of a filter of a gas generator according to yet another embodiment.

<Attached State Shown in FIG. 9>

FIG. 9 shows an embodiment of the gas generator 10 shown in FIG. 1 in which the filter 60 is attached in combination with a diffuser portion 250 and a cup member 270 as shown in FIG. 9. Moreover, portions not shown in FIG. 9 are the same as in FIG. 1.

The diffuser portion 250 has a cap-like shape including a closed end surface 251a and a peripheral surface 251b having a plurality of gas discharge ports 252.

The diffuser portion 250 includes a flange portion 251c at the opening, and further includes a cylindrical supporting wall 260 protruding toward the pressurized gas chamber 20 on an annular surface 253 of the flange portion 251c, facing the pressurized gas chamber 20.

The cylindrical supporting wall 260 is formed such that an outer cylindrical wall portion 261 and an inner cylindrical wall portion 262 that is shorter than the outer cylindrical wall portion are integrated in a thickness direction and an inner annular stepped surface 263 is formed by a level difference between the outer cylindrical wall portion 261 and the inner cylindrical wall portion 262.

The second rupturable plate 58 blocks the second communication passage 56, between the pressurized gas chamber 20 and the diffuser portion 250.

The cup member 270 accommodating the columnar filter 60 is disposed in the pressurized gas chamber 20 at a position directly facing the second rupturable plate 58 from the inside of the pressurized gas chamber 20. As the filter 60, a columnar filter manufactured by applying the manufacturing method of the filter (coolant) that is described in paragraphs [0025] to [0027] and illustrated in FIGS. 1 to 5 in JP-A No. 10-119705 is used.

The cup member 270 includes a bottom surface 271 with a plurality of communication holes 272 serving as a gas passage and a peripheral surface 273, and includes a plurality of (for example, two to six) claw portions 274 on the peripheral surface 273 at the opening portion.

In the cup member 270, a peripheral edge portion of the bottom surface 271 is abutted against the inner annular stepped surface 263 of the cylindrical supporting wall 260 and a portion of the peripheral surface 273 closed to the bottom surface 271 is abutted against an inner peripheral surface 261a of the outer cylindrical wall portion 261.

In the filter 60, the first end surface 61 is abutted against the cup member bottom surface 271, the filter peripheral surface 63 is abutted against the cup member peripheral surface 273, and an outer peripheral edge portion of the second end surface 62 is fixed by being pressed by the plurality of claw portions 274 bent inwardly. The plurality of claw portions 274 are formed on the peripheral surface 273 at the opening portion of the cup member 270.

While a length of the inner annular stepped surface 263 of the cylindrical supporting wall 260 is set approximately the same as a thickness of the flange portion 151c, the length of the inner annular stepped surface 263 can be set longer than the thickness of the flange portion 151c.

Therefore, in the embodiment shown in FIG. 9, a gap between the first end surface 61 of the filter and the second rupturable plate 58 is set larger than that in the other embodiments (FIGS. 1 to 6) described earlier.

When the gas generator 10 shown in FIG. 1 with the filter 60 attached thereto as shown in FIG. 9 is incorporated into an air bag system mounted to an automobile, similar operations to the gas generator 10 shown in FIG. 1 with the filter 60 attached thereto as shown in FIG. 7 are performed.

When a mixture gas of the combustion gas and the pressurized gas flows in from an opened surface (the second end surface 62) of the filter 60 and passes through the filter under high pressure (at high speed) during actuation, since the bottom surface 271 (having similar functions to the perforated plate member 180 shown in FIG. 8) including the plurality of communication holes 272 exists between the filter 60 and the second rupturable plate 58, fraying of the filter 60 is less likely to occur and a breakage property of the second rupturable plate 58 is not adversely affected. Therefore, performance of the gas generator stabilizes.

Figure 10:
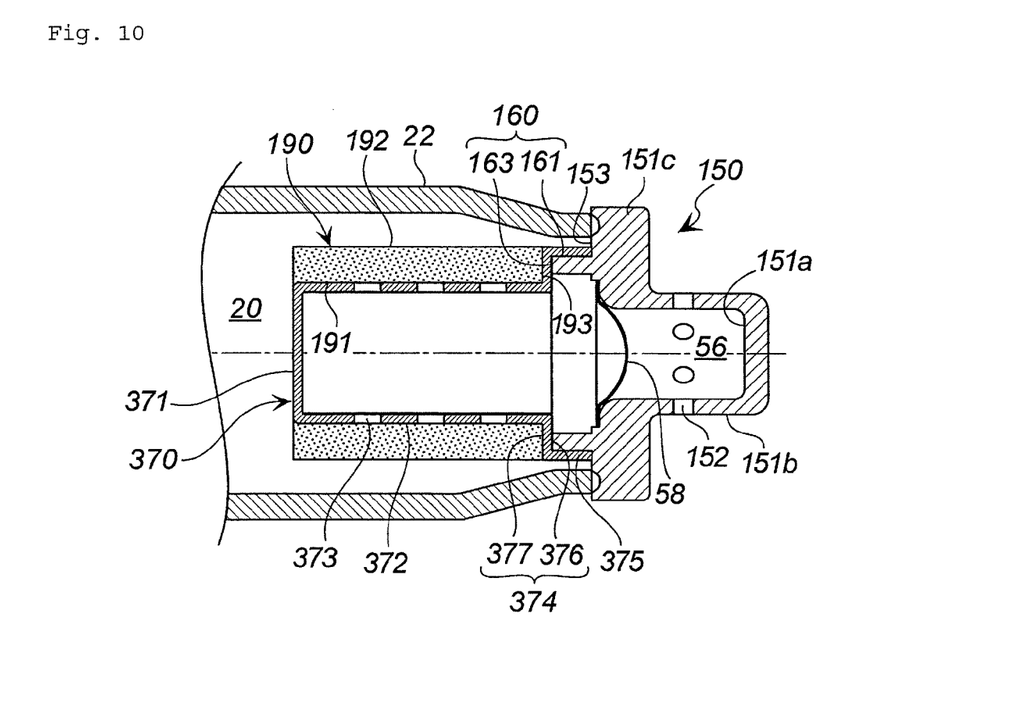
FIG. 10 shows a partial sectional view for describing an attachment of a filter of a gas generator according to yet another embodiment.

<Attached State Shown in FIG. 10>

FIG. 10 shows an embodiment of the gas generator 10 shown in FIG. 1 in which a cylindrical filter 190 is attached in combination with a diffuser portion 150 and a cup member 370 as shown in FIG. 10. Moreover, portions not shown in FIG. 10 are the same as in FIG. 1.

The diffuser portion 150 has a cap-like shape including the closed end surface 151a and the peripheral surface 151b having the plurality of gas discharge ports 152.

The diffuser portion 150 includes the flange portion 151c at the opening, and further includes the cylindrical supporting wall 160 protruding toward the pressurized gas chamber 20 on an annular surface 153 of the flange portion 151c, facing the pressurized gas chamber 20.

The second rupturable plate 58 blocks the second communication passage 56, between the pressurized gas chamber 20 and the diffuser portion 150.

The cup member 370 supporting the cylindrical filter 190 is disposed in the pressurized gas chamber 20 so as to cover the second rupturable plate 58 from the inside of the pressurized gas chamber 20. While a filter created by winding expanded metal a plurality of times to form a cylindrical laminate is used as the cylindrical filter 190, the other filters described earlier can also be used.

The cup member 370 includes a bottom surface 371, a peripheral surface 372 having a plurality of communication holes 373 serving as a gas passage, a flange portion 374, and an annular wall portion 375 extended from the flange portion 374 in a same direction as the peripheral surface 372. The communication holes 373 are formed in plurality at equal intervals in a peripheral direction at a plurality of different height positions on the peripheral surface 372.

In the cup member 370, an outer annular surface 376 of the flange portion 374 is abutted against the annular top portion 163 at a tip of the cylindrical supporting wall 160 and the annular wall portion 375 is abutted against the outer peripheral surface 161 of the cylindrical supporting wall 160.

In the cylindrical filter 190, an inner peripheral surface 191 is abutted against the outside of the cup member peripheral surface 372 having the plurality of communication holes 373, an outer peripheral surface 192 opposes the cylindrical pressurized gas chamber housing 22, and a first annular bottom surface 193 on the side of the diffuser portion 50 is abutted against an inner annular surface 377 of the flange portion 374 of the cup member.

While a length of the cylindrical supporting wall 160 is set approximately the same as a thickness of the flange portion 151c, the length of the cylindrical supporting wall 160 can be set longer than the thickness of the flange portion 151c.

Therefore, in the embodiment shown in FIG. 10, a gap between the first end surface 61 (the first annular bottom surface 193) of the filter and the second rupturable plate 58 is set larger than that in the other embodiments (FIGS. 1 to 6) described earlier.

When the gas generator 10 shown in FIG. 1 with the filter 60 attached thereto as shown in FIG. 10 is incorporated into an air bag system mounted to an automobile, similar operations to the gas generator 10 shown in FIG. 1 with the filter 60 attached thereto as shown in FIG. 7 are performed.

When a mixture gas of the combustion gas and the pressurized gas flows in from the outer peripheral surface 192 of the cylindrical filter 190 and passes through the filter under high pressure (at high speed) during actuation, since the inner peripheral surface 191 of the filter 190 is held by the peripheral surface 372 of the cup member 370, fraying is less likely to occur and a breakage property of the second rupturable plate 58 is not adversely affected. Therefore, performance of the gas generator stabilizes.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator inflating an air bag, comprising:
   a pressurized gas chamber having an outer shell that is formed by a cylindrical pressurized gas chamber housing, the pressurized gas chamber being filled with the pressurized gas;
   a combustion chamber connected to a first end portion of the pressurized gas chamber and including an ignition device and a gas generating agent accommodated in a combustion chamber housing;
   a diffuser portion connected to a second end portion of the pressurized gas chamber and provided with a gas discharge port;
   a first rupturable plate blocking a first communication passage between the pressurized gas chamber and the combustion chamber;
   a second rupturable plate blocking a second communication passage between the pressurized gas chamber and the diffuser portion;
   a filter disposed and positioned in the pressurized gas chamber to cover the second rupturable plate, the filter being allowing, during actuation, the combustion gas from the combustion chamber and the pressurized gas to pass therethrough and be discharged therefrom in response to rupturing the second rupturable plate; and a cup member including a bottom surface and a peripheral surface with a plurality of communication holes and accommodating the filter therein, the cup member being disposed in the pressurized gas chamber so as to cover the second rupturable plate from an inside of the pressurized gas chamber.

2. The gas generator according to claim 1, wherein
the second communication passage is blocked by the second rupturable plate having a peripheral edge portion fixed to a diffuser portion surface facing the pressurized gas chamber, and
the filter is attached such that a first end surface thereof facing the diffuser portion is disposed at a distance from a portion of the second rupturable plate at least excluding the peripheral edge portion.

3. The gas generator according to claim 1, wherein the diffuser portion has a protruding portion at a portion thereof facing the pressurized gas chamber,
the cup member includes a flange portion at an opening portion thereof, and
the cup member is fixed by the flange portion pressed against the diffuser portion with the protruding portion of the diffuser portion.

4. The gas generator according to claim 1, wherein the cylindrical pressurized gas chamber housing includes a uniform diameter portion with a uniform inner diameter and a minimum diameter portion formed at least at an opening on a side of the diffuser portion,
an inner peripheral surface of the cylindrical pressurized gas chamber housing includes an inclined surface portion with an inner diameter that continuously decreases from the uniform diameter portion toward the minimum inner diameter portion,
the cup member is press-inserted at the minimum inner diameter portion, and
a clearance is formed between the inclined surface portion and the peripheral surface of the cup member.

5. The gas generator according to claim 1, wherein
the diffuser portion is in a cap-like shape including a closed end surface, a peripheral surface having a plurality of gas discharge ports, a flange portion at an opening thereof, and a cylindrical supporting wall protruding toward the pressurized gas chamber on an annular surface of the flange portion, facing the pressurized gas chamber;
the cup member is fixed by being fitted to an outer peripheral surface of the cylindrical supporting wall from the outside,
the filter has a second end surface abutted against the bottom surface of the cup member and the peripheral surface abutted against the peripheral surface of the cup member, and is provided such that a peripheral edge portion of a first end surface is abutted against an annular top portion at a tip of the cylindrical supporting wall.

6. The gas generator according to claim 5, further comprising:
a perforated plate member having a plurality of communication holes serving as a gas passage provided at the first end surface of the filter, the perforated plate member being abutted against the annular top portion at the tip of the cylindrical supporting wall.

7. The gas generator according to claim 6, wherein the perforated plate member includes an annular wall extending from an outer peripheral edge thereof.

8. The gas generator according to claim 1, wherein the filter has a density of 1 to 5 $g/cm^3$.

9. The gas generator according to claim 1, wherein a clearance is formed between the cup member and a surface portion of the pressurized gas chamber, such that a gas inflow space is secured.

* * * * *